US006807618B1

(12) United States Patent
Kemeny

(10) Patent No.: US 6,807,618 B1
(45) Date of Patent: Oct. 19, 2004

(54) ADDRESS TRANSLATION

(75) Inventor: John Kemeny, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 406 days.

(21) Appl. No.: 09/924,923

(22) Filed: Aug. 8, 2001

(51) Int. Cl.$^7$ .............................................. G06F 12/10
(52) U.S. Cl. ........................ 711/209; 711/118; 711/202; 711/206
(58) Field of Search ............................... 711/105, 118, 711/202, 206, 209

(56) References Cited

U.S. PATENT DOCUMENTS

| | | | | |
|---|---|---|---|---|
| 6,151,662 A | * | 11/2000 | Christie et al. ............. | 711/145 |
| 6,499,032 B1 | * | 12/2002 | Tikkanen et al. ........... | 707/101 |
| 6,505,206 B1 | * | 1/2003 | Tikkanen et al. ........... | 707/101 |
| 6,549,210 B1 | * | 4/2003 | Van Hook et al. .......... | 345/561 |
| 2002/0046291 A1 | * | 4/2002 | O'Callaghan et al. ...... | 709/238 |
| 2002/0184231 A1 | * | 12/2002 | Baskins et al. ............. | 707/102 |

OTHER PUBLICATIONS

"What's Going on Inside the Box? ISV Access to Symmetrix Performance and Utilization Metrics", Jan. 2000, EMC Corporation.

"Growing an Enterprise Application Environment: A Guide to Achieving Terabyte Scalability", Aug. 1997.

"Symmetrix 8000 Enterprise Storage System: Product Description Guide", 2000, EMC Corporation.

Shaffer, "Designing Very Large Content Addressable Memories", Dec. 5, 1992.

Baeza–Yates, "Fast Text Searching for Regular Expressions or Automaton Searching on Tries", Nov. 1996.

Morrison, "PATRICIA—Practical Algorithm to Retrieve Information Coded in Alphanumeric", Oct. 1968.

Doeringer, "Routing on Longest–Matching Prefixes", 1996.

* cited by examiner

Primary Examiner—Mano Padmanabhan
Assistant Examiner—Jasmine Song
(74) Attorney, Agent, or Firm—Kevin A. Oliver; Foley Hoag LLP

(57) ABSTRACT

The description includes techniques of data storage address translation. The techniques can include receiving a first address in a first address space, traversing a trie based on the first address, and determining a second address based on the traversal.

13 Claims, 5 Drawing Sheets

ADDRESS TRANSLATION

BACKGROUND

A wide variety of devices store computer data. These devices vary greatly in their storage capacities and speeds. For example, a disk typically stores much more data than a memory chip. A memory chip, on the other hand, can often provide access to data much faster than a disk.

Many systems combine different types of storage devices to provide both large storage capacity and fast access to data. For example, a common technique for speeding data access involves caching (pronounced "cashing") data in high-speed memory. For instance, a data cache may store a copy of some data also stored by a slower storage device. When a request for the cached data arrives, a system can quickly respond to the request by accessing the cached copy instead of waiting for data retrieval by the slower storage device.

SUMMARY

In general, in one aspect, the description includes a method of data storage address translation. The method includes receiving a first address in a first address space, traversing a trie based on the first address, and determining a second address based on the traversal.

Embodiments may include one or more of the following features. The first address may have a different (e.g., larger) address space than the second address. The trie may include at least one leaf identifying an address in the second address space. The second address may be an address of a cache memory. The first address may be an address of permanent data storage. The second address associated with the first address may dynamically change, for example, based on changing cache contents.

The method may further include determining whether the cache stores information identified by the first address. Traversing the trie may include performing an operation on the first address and traversing the trie using the operation results.

The trie may be implemented as a multi-dimensional array where an index of a dimension of the array corresponds to different trie branches. Traversing such a trie may include repeatedly indexing into the array using a portion of the first address.

In general, in another aspect, the description includes a data storage system. The system includes a storage area having a first address space, a cache having a second address space, and instructions for causing a processor to receive a first address in the first address space, traverse a trie based on the first address, and determine a second address in the second address space based on the traversal.

In general, in another aspect, the description includes a computer program product, disposed on a computer readable medium, for data storage address translation. The computer program includes instructions for causing a processor to receive a first address within a first address space, traverse a trie based on the first address, and determine a second address based on the traversal.

In general, in another aspect, the description includes a method of data storage address translation at a system having a storage area composed of different physical devices, a shared cache for caching blocks of data in the storage area, and connections to different host processors. The method includes receiving a storage area address within a storage area address space based on a request received from one of the host processors, traversing a trie based on the storage area address, the traversing identifying a trie leaf identifying a cache address in a cache address space, and changing the cache address associated with the trie leaf based on an alteration of cache contents.

In general, in another aspect, the description includes a memory for storing data for access by an application program being executed on a data processing system. The memory includes a data structure that includes information corresponding to a trie having leaves identifying different respective cache addresses.

Advantages will become apparent in view of the following description, including the figures and the claims.

DETAILED DESCRIPTION

Figure 1:
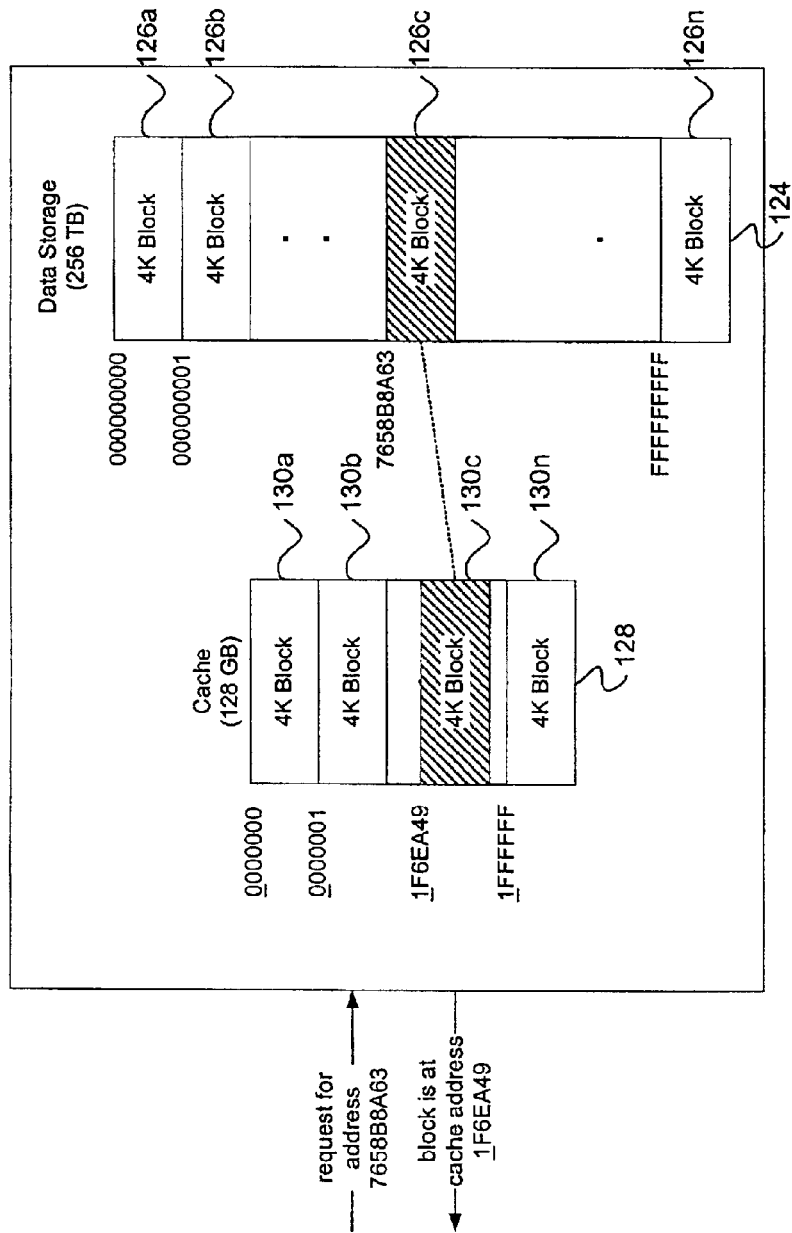
FIG. 1 is a diagram illustrating data address translation.

FIG. 1 illustrates operation of a caching system. As shown, the system includes a cache 128 that stores a copy 130c of a block of data 126c also stored in a storage area 124 (e.g., physical disk storage). Using this cached copy 130c, a system can quickly respond to a request for block 126c. The speed of the response depends, in part, on how quickly the system can exists within the cache 128. Described herein are techniques that can, among other applications, enable a system to efficiently determine the location of data stored within a cache 128.

In greater detail, FIG. 1 depicts a sample configuration that features a 256 TB (Terabyte) storage area 124 divided into 4K (Kilobyte) sized blocks 126a–126n. Each block 126a–126n has an address identifying its location within the storage area 124. For example, FIG. 1 depicts a common addressing scheme that sequentially numbers each block 126a–126n. That is, the first block 126a stored in storage area 124 has an address of "000000000", while the second block 126b has an address of "000000001". FIG. 1 depicts the different block 126a–126n addresses in hexadecimal (i.e., base 16) notation where each digit represents a collection of four bits.

As shown, the storage device 124 holds 236 4K blocks (i.e., 256 TB/4K=$2^{36}$). Thus, the address of a block 126a–126n in storage area 124 can be within a range of addresses from 0 to $2^{36}-1$. Hence, each block 126a–126n can be uniquely identified by a 36-bit address. The range of possible addresses of a block 126a–126n is known as the storage area's 124 block address space.

As shown, the cache 128 offers less storage capacity, 128-GB (Gigabytes), than the storage area 124. That is, instead of $2^{36}$ 4K blocks, the cache 128 only stores $2^{25}$ 4K blocks. Thus, the cache 128 features a smaller 25-bit address space that includes addresses ranging from 0 to $2^{25}-1$.

Since the smaller sized cache 128 cannot simultaneously hold every block 126a–126n stored in storage area 124, a system can rapidly juggle the data blocks 126a–126n stored in the cache 128 based on current and/or predicted future data access requests. That is, while FIG. 1 depicts a copy 130c of block 126c stored at cache address "1F6EA49", the cache block at address "1F6EA49" may later hold a copy of a different storage device block 126a–126n. Additionally, the storage 124 block 126c at storage 124 address "7658B8A63" may later be stored by the cache at an address other than "1F6EA49".

Figure 2:
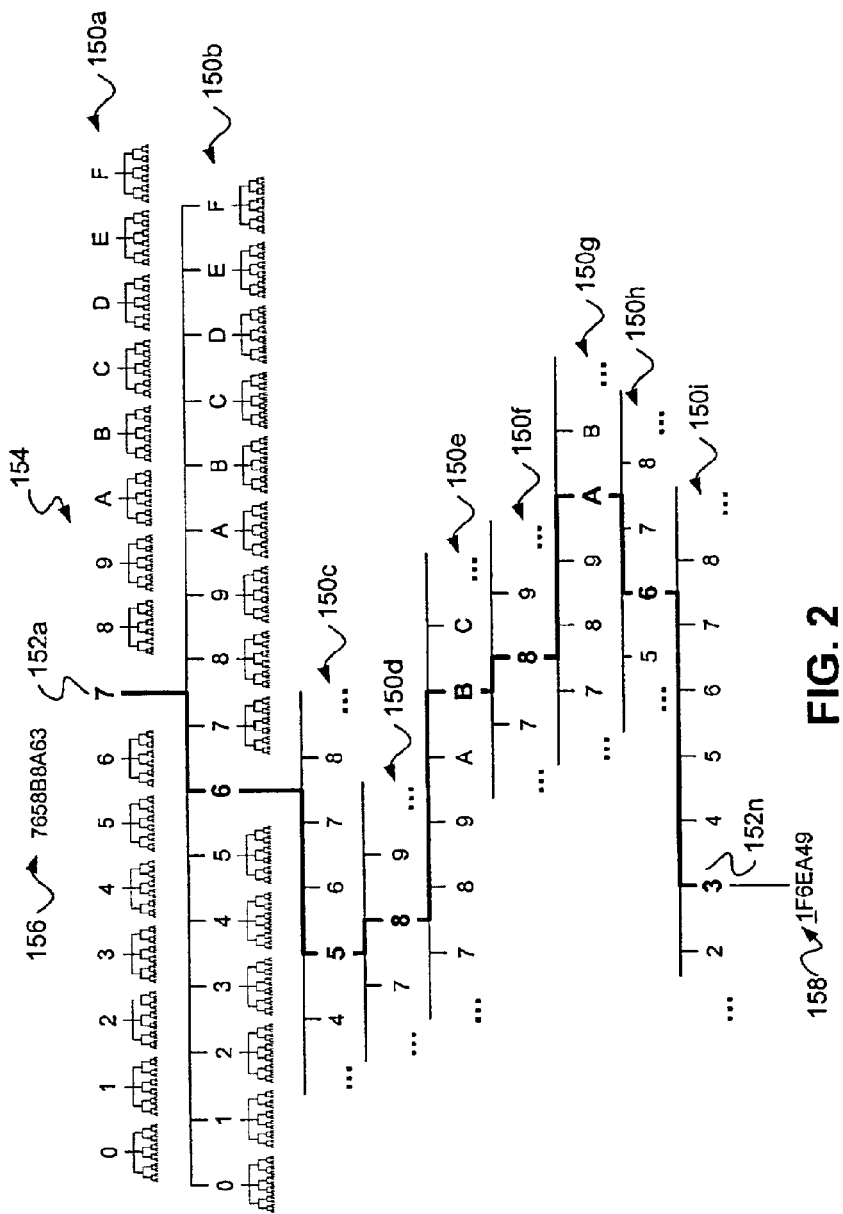
FIG. 2 is a diagram of a representation of a trie.

FIG. 2 illustrates a technique for translating or mapping one address to another. This technique uses a data structure known as a "trie". By traversing a trie 154 based on a first address 156 (e.g., a storage area address), a system can quickly determine a second address 158 (e.g., a cache address).

In greater detail, FIG. 2 shows a representation of a portion of a trie 154. The trie 154 includes branches and leaves. For example, the top-level of trie branches 150a includes a branch for different possible values of the first hexadecimal digit (i.e., the first four bits) of the first address 156.

The trie 154 hierarchically relates the trie 154 branches. For example, branches 150b are offshoots of parent branch 152a. In the example shown, the hierarchical level of a branch corresponds to the address portion represented by the branch. For example, branches on the first hierarchical level 150a identify possible values for the first hexadecimal digit of the first address 156, while branches on the second hierarchical level 150b identify possible values for the second hexadecimal digit.

As shown, the first address 156 defines a traversal path, bolded, through the trie 154. For instance, the first hexadecimal digit, "7", of the first address, "7658B8A63", corresponds to branch 152a. Similarly, the second hexadecimal digit, "6", representing the second set of four bits of the first address, "7658B8A63", specifies the "6" of branches 150b. This traversal of the trie 154 can continue for each set of bits in the address 156.

The trie 154 also includes leaves 158 that can, for example, refer to data identifying an address in the second address space (e.g., the cache address space). For example, the leaf 158 attached to branch 152n identifies cache address "1F6EA49". Thus, using the first address 156 to determine a path through the trie 154 that reaches leaf 158 can yield a cache address storing the block of storage area address 156.

While not a requirement for use of the techniques described herein, the trie shown in FIG. 2 can provide fully associative addressing. That is, a given storage address may be associated with any cache address instead of some limited set of cache addresses. Similarly, any cache address may be associated with any storage address.

The trie 154 dynamically changes as blocks move into and out of the cache 128. For example, the cache address of a trie 154 leaf may be set to NULL when a storage area block is removed from the cache 128. Similarly, when brought into the cache, the trie 154 leaf may be set to the block's new cache address.

FIG. 2 only shows a small portion of the trie 154. For example, instead of the handful of branches shown, the trie 154 can feature branches that collectively represent all possible addresses in the address space of the first address.

A number of different tries 154 may be used instead of the trie 154 shown. For example, instead of sets of four bits, trie 154 branches may represent other sets of n bits. Similarly, instead of representing the beginning of an address, the top-level 150a may represent some other portion of an address space such as the end of the address (e.g., the last four bits), or some other arbitrary configuration. Additionally, some operation, such as a hash function, may be applied to the first address 156 before trie 154 traversal.

In such an embodiment, the trie 154 branches would represent portions of the hash function result rather than portions of the first address 156.

As shown in FIG. 2, the trie 154 path included eight branches corresponding to the eight sets of four bits in the first address 156. However, a traversal may identify a second address, such as address 158, without using all information in the first address 156. For example, a leaf reached by traversing the trie 154 using only the first four hexadecimal digits "7658" may identify a second address when no other addresses starting with "7658" have been cached. That is, the first four hexadecimal digits (the first sixteen bits) can uniquely identify the second address 158 without continued traversal.

Additionally, the number of branches included in a traversal may identify the size of a data request. For example, full traversal of "7658B8A63" may identify a specific 4K block, e.g., at "1F6EA49". A partial traversal, such as a traversal of "7658B8A6", however, may specify the address of a 64K set of blocks ranging from "7658B8A60–7658B8A6F".

Figure 3:
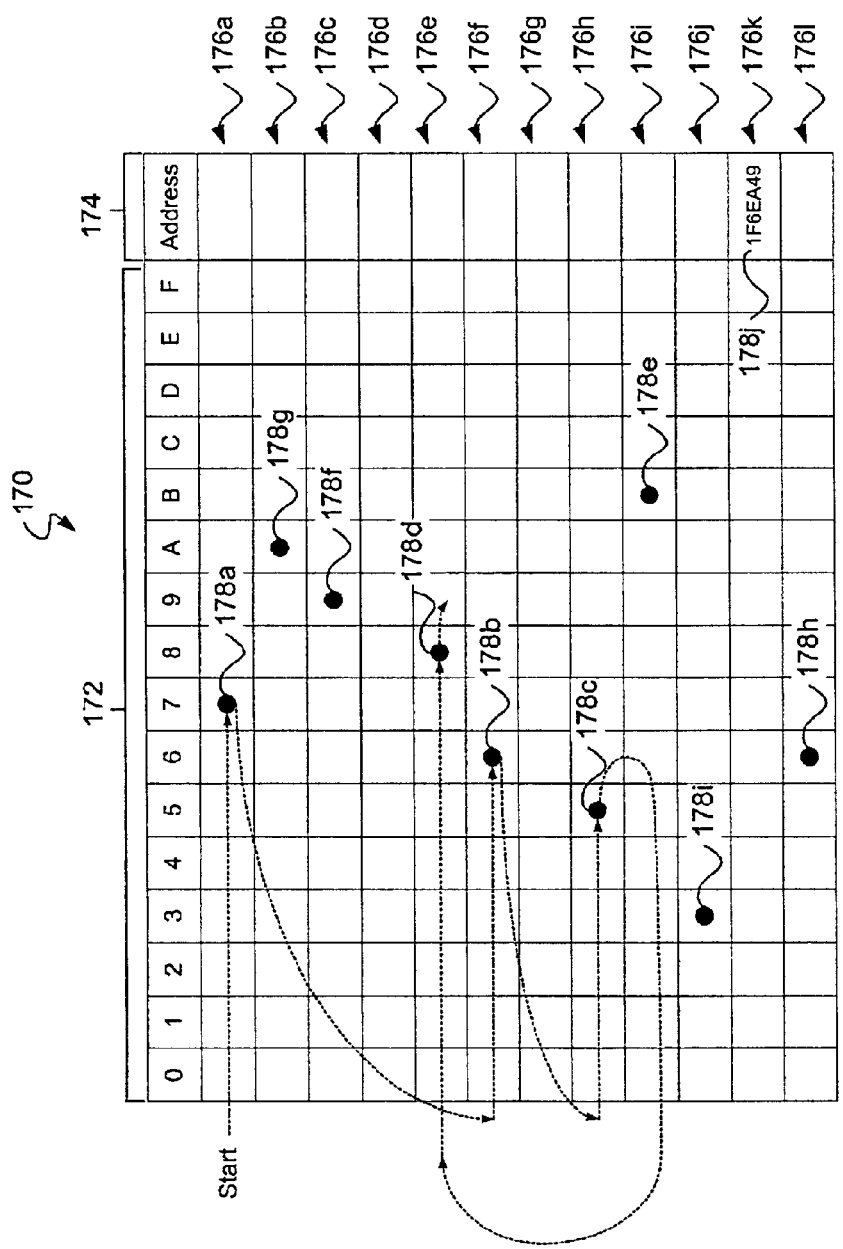
FIG. 3 is a diagram of a multi-dimensional array implementation of a trie.

A number of different data structures can implement a trie 154. For example, linked lists or other information networks can store trie 154 information. For instance, FIG. 3 depicts an implementation that uses a multi-dimensional array 170. The array 170 shown includes two dimensions. One dimension represents rows 176a–176l of a table. The other dimension represents table columns 172–174.

Each row 176a–176l can include information corresponding to a set of trie branches. For example, row 176a corresponds to trie branches 150a while columns 172 identify different individual branches in the set 150a. The array member specified by a particular row 176a–176l and column 172 coordinate can identify a different row 176a–176l storing the next hierarchically lower set of trie branches. Repeatedly using different portions of a first address to index into rows 176a–176l and advancing to the row specified by the indexing results in fast traversal of the trie represented by the array 170.

To illustrate, FIG. 3 depicts traversal of a trie based on an address of "7658B8A63". As shown, the first set of four bits of the address, hexadecimal "7", of the address specify array member 178a of row 176a. Array member 178a stores a pointer to row 176f that stores information for branches 150b in FIG. 2. Indexing into row 176f using the second set of four bits of the address, hexadecimal "6", yields array member 178b. This array member 178b, in turn, stores a pointer to row 176h, the equivalent of branches 150c in FIG. 2. This indexing repeats for each set of bits in the address and forms a path through the array 170. As shown, traversal may not access rows 178a–178i in top-down order.

As shown, the array 174 may include an additional column 174 for trie leaves that can identify the second address 178j associated with trie traversal. If a block identified by the storage address 156 has not been cached or has been removed from the cache, the array member 178j stores a NULL value.

The array member 178j may also store other information such as the storage address associated with the cache address. This can enable verification that a system will retrieve the correct block from the cache.

The array member 178j may also store information used to identify blocks to remove from a cache. For example, the array member may include data indicating when the cached block was last accessed. This information enables a cache to identify cache blocks to release, for example, in a LRU (Least Recently Used) scheme.

The array shown in FIG. 3 can conserve memory. This can be particularly important when the array 170 occupies valuable cache memory. As an example, an array 170 for the storage area 124 shown in FIG. 1, can include $2^{25}$ rows. Each row of such an array can include sixteen 25-bit pointers to other rows in the array and a 25-bit cache address. Thus, the array as a whole consumes ($2^{25}$ rows×(17 columns×25 bits)) bits (i.e., ~1.7 GB). This is considerably less space than an array having an array element for every storage area address (e.g., 25 bits×$2^{36}$ array elements=~209 GB).

Figure 4:
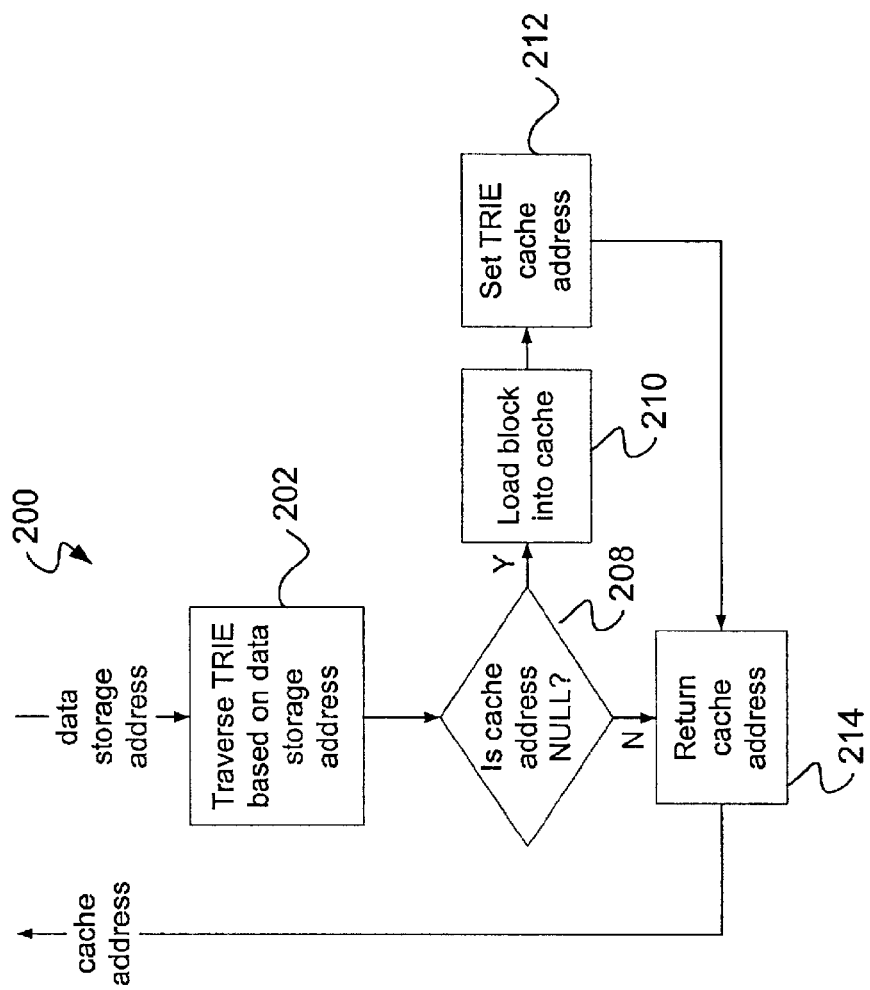
FIG. 4 is a flow-chart of a data address translation process using a trie.

FIG. 4 illustrates an example process 200 for translating a first-address, such as a storage device address, to a second address, such as a cache address. As shown, the process 200 traverses 202 a trie based on a first address. Based on the traversal, the process 200 can determine whether the first address identifies a cached block, for example, by determining 208 whether the cache address associated with the traversal is NULL. If the block has not been cached, the storage area block identified by the first address may be cached 210 and the corresponding cache address stored 212 in the trie. Finally, the process 200 can return 214 the cache address associated with the storage device address.

Figure 5:
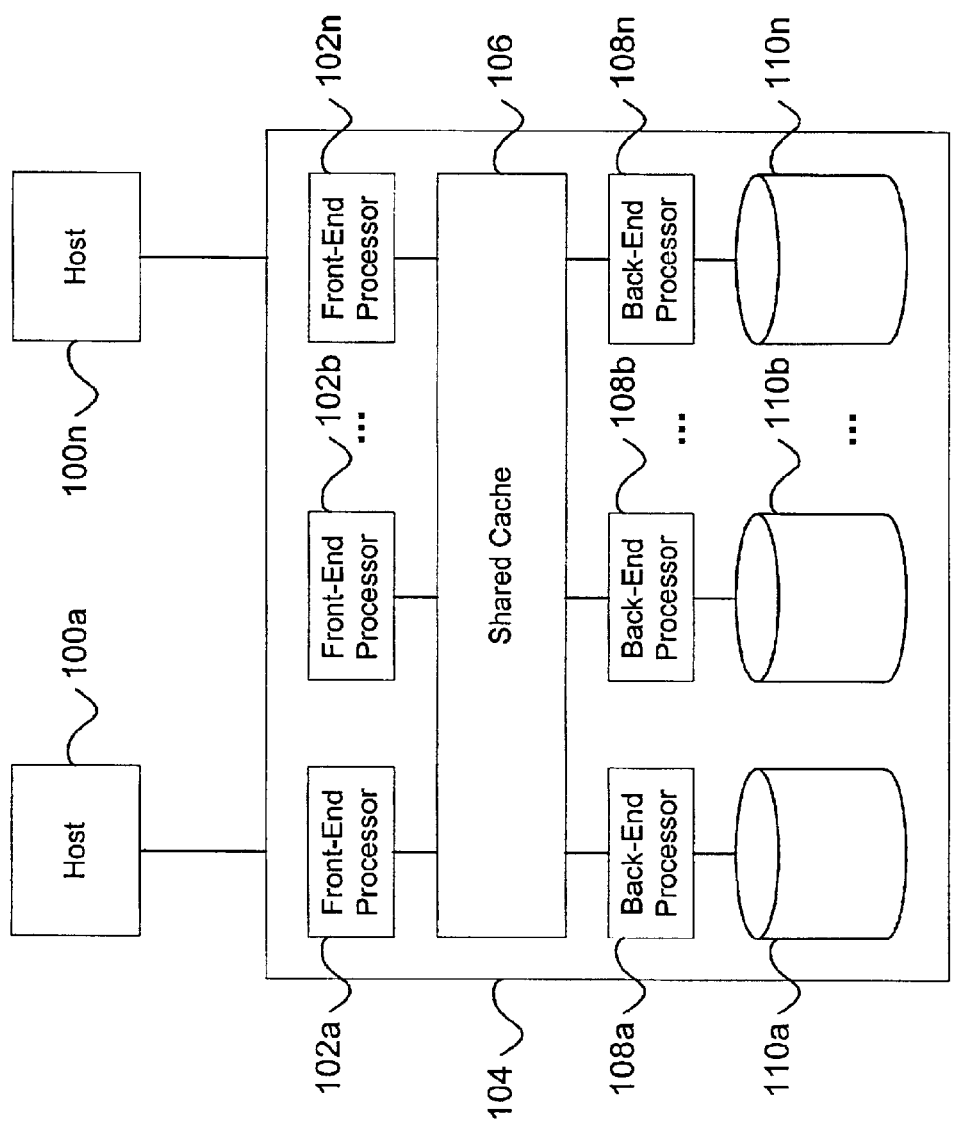
FIG. 5 is a diagram of a data storage system.

The techniques described above may be used in a variety of environments. For example, the address translation techniques may be incorporated into the cache management schemes used by a Symmetrix® data storage system manufactured by EMC® of Hopkington, Mass. FIG. 5 illustrates the Symmetrix® architecture.

As shown in FIG. 5, the Symmetrix® system 104 uses a shared cache 106 to speed host processor 100a–100n access to data stored by a collection of permanent storage devices 110a–110n. In greater detail, the system 104 includes front-end processors 102a–102n that receive requests from the host processors 100a–100n for access to blocks of data stored by the permanent storage devices 110a–110n. The front-end processors 102a–102n determine whether the cache 106 currently stores a data block that includes the requested data. If so, the front-end processors 102a–102n can use the cached block to quickly satisfy the host 100a–100n request. If not, the front-end processors 102a–102n can ask a back-end processor 108a–108n to load the appropriate block(s) into the cache 106. Thus, if another request for the same block soon follows, the front-end processors 102a–102n can quickly respond to the request without waiting for retrieval by the back-end processors 110a–110n.

The address translation techniques described herein can speed cache operations of the Symmetrix® system 104 described above. These techniques, however, have broader applicability. For example, many systems feature multiple cache levels. For instance, an additional cache may be interposed between the hosts 100a–100n and the Symmetrix® system 104 shown in FIG. 5. Thus, the trie techniques can map between the additional cache and the Symmetrix® cache, instead of between a cache and an address in a mass storage device.

The techniques described herein are not limited to a particular hardware or software configuration and may find applicability in a wide variety of computing or processing environment. The techniques may be implemented in hardware or software, or a combination of the two. For example, the techniques may be implemented in ASICs. The techniques may also be implemented in computer programs executing on programmable computers that each include a processor, a storage medium readable by the processor (including volatile and non-volatile memory and/or storage elements), at least one input device, and one or more output devices.

Each program may be implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method comprising:
   representing a plurality of memory addresses associated with at least one storage device as a plurality of hierarchical branches in a trie data structure;
   receiving a request for data stored at a particular one of the memory addresses of the at least one storage device;
   traversing at least some of the hierarchical branches in the trie data structure using different portions of the particular one of the memory addresses storing the requested data;
   identifying a memory address associated with a cache memory based on the traversal, the identified cache memory address being stored in a leaf of the trie data structure; and
   transmitting data stored at the identified cache memory address in response to the request.

2. The method of claim 1, wherein the trie data structure comprises a multi-dimensional dimensional array, wherein an index of a dimension of the array corresponds to different trie data structure branches.

3. The method of claim 2, wherein traversing the trie data structure comprises, repeatedly, indexing into the dimension of the array using the different portions of the particular one of the memory addresses.

4. The method of claim 1, wherein traversing the trie data structure using the different portions of the particular one of the memory addresses comprises
   performing an operation on at least one of the different portions of the particular one of the memory addresses; and
   traversing the trie data structure using the operation results.

5. The method of claim 1, wherein the cache memory address associated with the particular one of the memory addresses dynamically changes.

6. A data storage system, comprising:
   (a) at least one storage device;
   (b) a cache memory;
   (c) instructions for causing a processor to:
      (1) represent a plurality of memory addresses associated with the at least one storage device as a plurality of hierarchical branches in a trie data structure;
      (2) receive a request for data stored at a particular one of the memory addresses of the at least one storage device;

(3) traverse at least some of the hierarchical branches in the trie data structure using different portions of the particular one of the memory addresses storing the requested data;

(4) identify a memory address associated with the cache memory based on the traversal, the identified cache memory address being stored in a leaf of the trie data structure; and (5) transmit data stored at the identified cache memory address in response to the request.

7. The data storage system of claim 6, wherein the instructions for causing the processor to traverse the trie data structure based on the different portions of the particular one of the memory addresses comprise instructions for causing the processor to:

perform an operation on at least one of the different portions of the particular one of the memory addresses the first address; and traverse the trie data structure using the operation results.

8. The data storage system of claim 6, wherein the cache memory address associated with the particular one of the memory addresses dynamically changes.

9. A computer program product, disposed on a computer readable medium, the computer program product including instructions for causing a processor to:

represent a plurality of memory addresses associated with at least one storage device as a plurality of hierarchical branches in a trie data structure;

receive a request for data stored at a particular one of the memory addresses of the at least one storage device;

traverse at least some of the hierarchical branches in the trie data structure using different portions of the particular one of the memory addresses storing the requested data;

identify a memory address associated with a cache memory based on the traversal, the identified cache memory address being stored in a leaf of the trie data structure; and transmit data stored at the identified cache memory address in response to the request.

10. The computer program product of method of claim 9, wherein the trie data structure comprises a multi dimensional array, wherein an index of a dimension of the array corresponds to different trie data structure branches.

11. The computer program product of claim 10, wherein the instructions for causing the processor to traverse the trie data structure comprise instructions for causing the processor to, repeatedly, index into the dimension of the array using the different portions of the particular one of the memory addresses.

12. The computer program product of claim 9, wherein the instructions for causing the processor to traverse the trie data structure using the different portions of the particular one of the memory addresses comprises instructions for causing the processor to:

perform an operation on at least one of the different portions of the particular one of the memory addresses; and traverse the trie data structure using the operation results.

13. The computer program product of claim 9, wherein the cache memory address associated with the particular one of the memory addresses dynamically changes.

* * * * *